(12) United States Patent
Ricketts

(10) Patent No.: US 7,276,155 B1
(45) Date of Patent: Oct. 2, 2007

(54) WASTE TREATMENT APPARATUS WITH INTEGRAL MEMBRANE APPARATUS

(75) Inventor: Donald D. Ricketts, Monterey, VA (US)

(73) Assignee: Wastewater Technology, Inc., Monterey, VA (US)

( * ) Notice: Subject to any disclaimer, the term of this patent is extended or adjusted under 35 U.S.C. 154(b) by 0 days.

(21) Appl. No.: 11/417,191

(22) Filed: May 4, 2006

(51) Int. Cl.
    *C02F 3/00* (2006.01)
(52) U.S. Cl. .................... 210/151; 210/252; 210/532.1
(58) Field of Classification Search ............... 210/151, 210/252, 532.1
    See application file for complete search history.

(56) References Cited

U.S. PATENT DOCUMENTS

| | | | |
|---|---|---|---|
| 3,472,765 A * | 10/1969 | Okey et al. ................. | 210/607 |
| 3,598,726 A * | 8/1971 | Welch ........................ | 210/602 |
| 3,992,301 A | 11/1976 | Shippey et al. | |
| 4,093,539 A * | 6/1978 | Guarino ..................... | 210/619 |
| 4,145,279 A * | 3/1979 | Selby, III ................... | 210/614 |
| 4,211,647 A * | 7/1980 | Friedman et al. ........... | 210/603 |
| 4,239,714 A | 12/1980 | Sparks et al. | |
| 4,372,859 A | 2/1983 | Sugimoto et al. | |
| 4,981,594 A | 1/1991 | Jones | |
| 5,415,781 A | 5/1995 | Randhahn et al. | |
| 5,607,593 A | 3/1997 | Cote et al. | |
| 5,714,066 A | 2/1998 | Jang | |
| 6,039,873 A | 3/2000 | Stahler | |
| 6,039,875 A | 3/2000 | Christiansen et al. | |
| 6,395,181 B1 | 5/2002 | Mullerheim | |
| 6,423,236 B1 | 7/2002 | Shiota et al. | |
| 6,512,714 B2 | 1/2003 | Hanzawa et al. | |
| 6,572,774 B2 | 6/2003 | Ricketts | |
| 6,613,229 B2 * | 9/2003 | Ricketts ..................... | 210/605 |
| 6,887,385 B2 | 5/2005 | Tonkin et al. | |
| 7,156,985 B1 * | 1/2007 | Frisch ........................ | 210/150 |
| 7,172,690 B2 | 2/2007 | Stahler | |
| 2003/0094406 A1 | 5/2003 | Smith et al. | |
| 2005/0067341 A1 | 3/2005 | Green et al. | |
| 2005/0082227 A1 | 4/2005 | Cote et al. | |
| 2005/0103717 A1 | 5/2005 | Jha et al. | |
| 2005/0121388 A1 | 6/2005 | Wood et al. | |
| 2005/0145548 A1 | 7/2005 | Rhoades | |
| 2005/0236327 A1 | 10/2005 | Gordon et al. | |
| 2006/0163157 A1 * | 7/2006 | Cote et al. .................. | 210/615 |
| 2006/0201876 A1 * | 9/2006 | Jordan ........................ | 210/609 |

* cited by examiner

*Primary Examiner*—Chester T. Barry
(74) *Attorney, Agent, or Firm*—Stevens Davis Miller & Mosher, LLP

(57) ABSTRACT

A wastewater treatment method and apparatus including a denitrification (anoxic) chamber for denitrifying wastewater, an aeration basin with Bio-Wheel for aerating the wastewater, and a membrane device in which sludge particles are separated out of the wastewater, leaving clean discharge water and reusable sludge. Sludge from the membrane chamber floor is sent back to the aeration basin or denitrification chamber or both. Excess sludge is wasted or held for further processing. Preferably, the method and apparatus facilitate both activated sludge and fixed film processes.

20 Claims, 3 Drawing Sheets

WASTE TREATMENT APPARATUS WITH INTEGRAL MEMBRANE APPARATUS

BACKGROUND OF THE INVENTION

1. Field of the Invention

The invention relates to treatment of wastewater through a membrane to significantly reduce the size and number of particulates in the treated wastewater.

2. Description of the Prior Art

Biological treatment of wastewater often employs either activated sludge or fixed film processing steps. Activated sludge is the semi-liquid biomass removed from the liquid flow of wastewater, particularly from the liquid flow of wastewater. Before it is fully decomposed by aerobic microbial decomposition, activated sludge is put into aeration tanks to facilitate and further undergo aerobic microbial decomposition. Fixed film processes may use biological aerators that rotate around a central horizontal shaft, which is submerged in the wastewater. As the aerators reemerge from the surface of the wastewater, they catch air in specially profiled cells.

A typical activated sludge apparatus uses an aeration tank, also referred to as an aeration basin or biotank housing a cell segment contact aerator, and a separate settling tank or gravity clarifier, also referred to as a settling tank or gravity separator. See, for example, U.S. Pat. No. 6,039,873, to Stahler, the entire disclosure of which is herein incorporated by reference. The purpose of the clarifier is to remove the suspended solid particles in the wastewater. The solid particles range in size from microscopically fine to rather coarse, and consist primarily of undissolved or unoxidized material, spent bacteria and other microorganisms. The clarifier can be one of a number of types, including circular, hopper bottom or rectangular. In the prior art, however, they are all separate from the aeration tank.

In order to solve the deficiencies of conventional devices, rotary aerators have been developed. Exemplary rotary aerators or BIO-WHEEL and BIO-ROTOR devices available from Wastewater Technology, Inc. of Monterey, Va. are described by U.S. Pat. Nos. 6,572,774 and 6,613,229 to Ricketts, each of which is herein incorporated by reference in its entirety.

However, even when the rotary aerators are utilized, it has been difficult, if even possible to reduce particulates to (1) no more than 5 mg/L for BOD (biochemical oxygen demand, i.e., the concentration of biodegradable organic matter) and total suspended solids; (2) no more than 5 mg/L for total nitrogen; and (3) no more than 0.5 mg/L for total phosphorous.

SUMMARY OF THE INVENTION

The present invention combines the activated sludge/fixed film process, often used with the Bio-Wheel systems, with a membrane filter for advanced wastewater treatment. The advantages of the Bio-Wheel are well known, and include a combination of activated sludge and fixed film integrated fixed-film activated sludge (IFAS) to treat domestic and certain industrial wastewater to remove impurities including carbonaceous material, ammonia, nitrates and nitrites, and phosphorous by use of normally occurring bacteria and microorganisms. The activated sludge/fixed film process has been in use for a number of years, however accomplishing this with the Bio-Wheel results in low electrical power consumption and ease of operation with minimal controls.

Both flat plate and hollow fiber membranes are used for the treatment of wastewater, however membranes do not provide any aeration or biological treatment, and only act as an extremely fine filter for previously treated wastewater. Carbonaceous material, nitrogen, ammonia and phosphorous must be removed by biological or chemical treatment before the wastewater passes through the membrane. Membranes, in contrast, remove solid particles which are approximate to or larger than the membrane pores.

The Bio-Wheel activated sludge/fixed film process typically uses a settling tank or clarifier after the biological process which may include anaerobic and anoxic, as well as aerobic tanks. The purpose of the clarifier is to settle solids from the treated wastewater. There are many occasions where conditions are not optimal for settling of the sludge, such as a very low oxygen concentration in the clarifier, which results in denitrification which causes generated gasses to lift the settled sludge to the surface of the clarifier. In addition, certain types of bacteria, such as filamentous bacteria do not settle well, and come to the surface of the clarifier. Upsets of the clarifier caused by sudden infusions of cold water, temperature changes, or high hydraulic flow can cause the settled or unsettled solids and floc to overflow the clarifier weir, and be discharged in the treated effluent. There is no physical barrier to the discharge of these solids and floc into the effluent stream.

It has become desirable to have virtually no solids in the discharged effluent, and according to the invention, replacing the clarifier with a membrane device could eliminate the disadvantages of the clarifier. The membrane, either flat plate or hollow fiber, can present a physical barrier to the discharge of solids larger than the pore openings of the membrane.

When combined with an efficient membrane, the activated sludge fixed film process, using a rotary aerator, further reduces electrical power consumption in the entire wastewater treatment process, decreases the required volume of space and provides a much more stable process which is able to survive upsets in hydraulic flow, high or low influent strengths, and provides ease of operation. In addition the membrane can remove cryptosporidium and E. coli bacteria. Removal of solids and these bacteria are desirable in order to use the treated wastewater for irrigation, or discharge into the ground where the water will return to an aquifer.

Although the drawings and description detail a flat plate membrane, this invention presents the use of hollow fiber membranes as an alternative or in addition to a flat plate membrane. A person skilled in the design of advanced wastewater treatment plants could substitute a hollow fiber membrane for the flat plate membranes with minor changes to the flow diagram. Likewise, the configuration shown could be reconformed to include an anaerobic zone, or to revise or reverse the location of the individual elements with respect to each other.

The method and apparatus of the invention will be better understood by reference to the appended drawings and the following description.

DETAILED DESCRIPTION OF THE PREFERRED EMBODIMENTS

Figure 1:
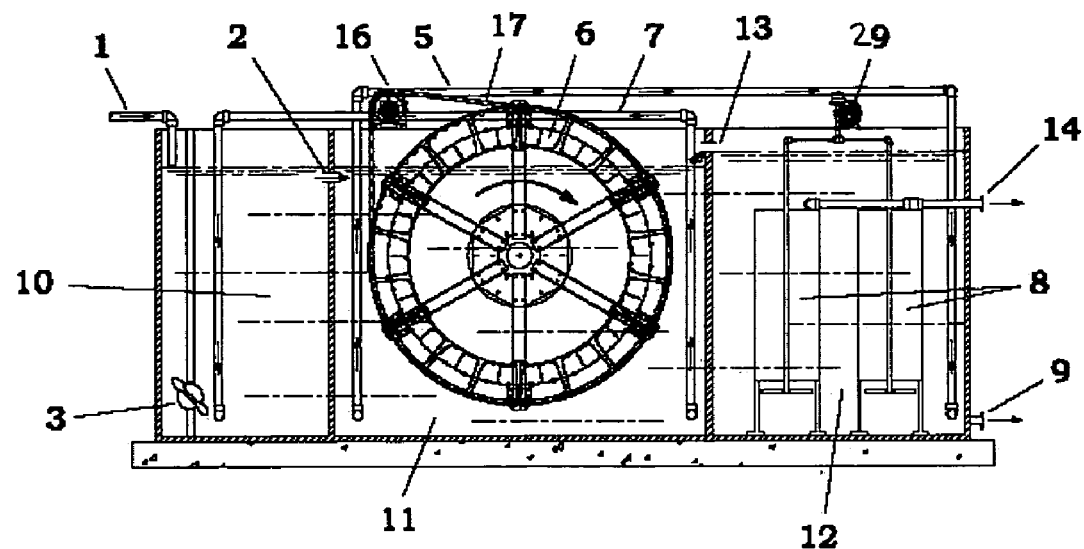
FIG. 1 is a cross-sectional side view of a first embodiment of the apparatus of the invention.
Figure 2:
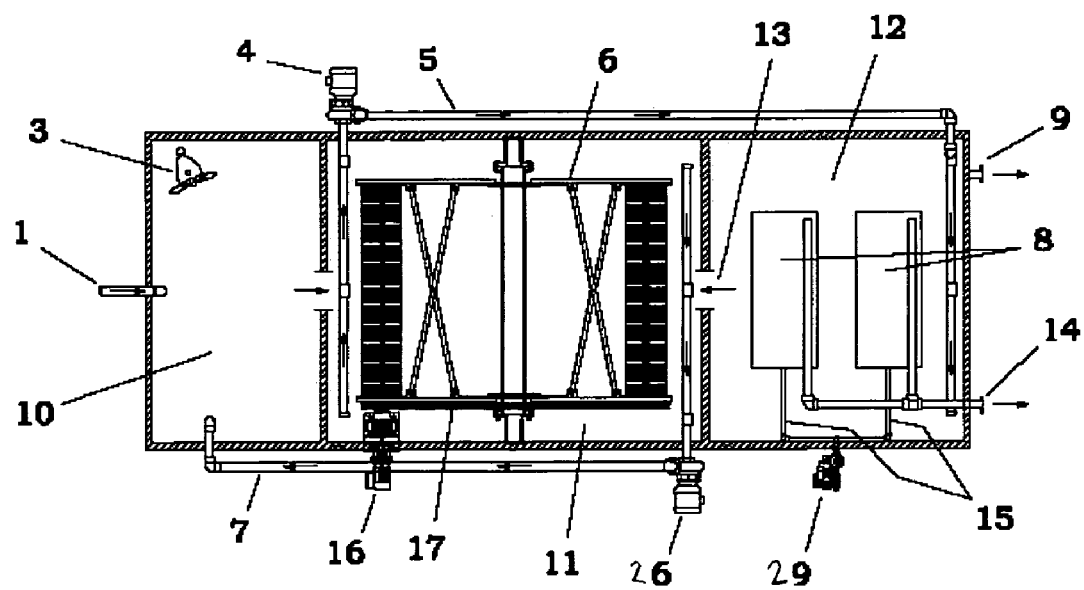
FIG. 2 is a plan view of the embodiment of FIG. 1.

FIG. 1 depicts a cross-sectional side view of a waste treatment apparatus, with FIG. 2 showing a plan view. Raw domestic or suitable industrial wastewater enters through a pipe 1 and flows into an anoxic denitrification tank 10, where the wastewater typically mixes with sludge to form a mixed liquor to remove nitrogen compounds.

The sludge, which typically contains viable bacteria and microorganisms, reacts with the wastewater in the anoxic basin to further the activated sludge process, including denitrification.

Following treatment in anoxic denitrification tank 10, water overflows by gravity through opening 2 into an aeration tank 11, which may or may not be replaced by or supplemented with a pump. Typically, aeration tank 11 includes a rotary aerator 6, such as a BIO-WHEEL apparatus, as described in U.S. Pat. Nos. 6,572,774 and 6,613,229 (each of which is expressly incorporated herein in its entirety). Although less preferred, it is considered within the scope of the invention to use other types of rotary aerators, such as a contact aerator as described by U.S. Pat. No. 6,039,873, herein incorporated by reference in its entirety.

The rotary aerator 6 is rotated, preferably by an electrical gearmotor 16 through a chain 17 which causes aeration of the wastewater, and provides a fixed film for additional treatment. The rotary aerator 6 performs as an IFAS activated sludge fixed film process.

The rotary aerator 6 aerates the mixed liquor in the aeration tank 11. In more preferred embodiments, the rotary aerator 6 can operate as a hybrid of activated sludge and fixed film processes to treat the mixed liquor. Approximately 75-80 percent of the treatment takes place in the activated sludge component and 20-25 percent takes place in the fixed film component. The combination of the two technologies takes advantage of the best aspects of both types of treatment. In such cases, the aerating device preferably comprises a rotary fixed film aerator with biological contact aerator cell segments. A most preferred type of fixed film aerator, known as a BIO-WHEEL (a trademark of Wastewater Technology Inc., of Monterey, Va.), lacks external aerators, such as diffusers, that are present on typical fixed film aerators. Rather, the aerators are preferably part and parcel of the rotary aerator.

The aeration tank 11 optionally is followed (or preceded) by one or more clarifiers 30 (not shown). The clarifying device may be a conventional clarifier or a filter. In either case, the clarifying means separates the solids and bacteria from the water, discharges the clear water and returns the solids to either the aeration basin or the denitrification chamber or both. As discussed above, conventional clarifiers cannot removal all suspended solids or bacteria, and thus, clarified water obtained from this treatment cannot be discharged into the ground, e.g., for irrigation or return to an aquifer. Unlike a conventional clarifier, however, a filter needs little space. Further, a filter is not disturbed by movement. Also, the amount of sludge that is filtered can be controlled by the pressure and size of the openings in the filter, leading to better control. While tertiary filters have been employed in water treatment plants, there is a limit to the size of solids and bacteria that can be removed, i.e., more than 10 microns. Thus, it may be possible according to the invention to eliminate a tertiary filter from the treatment plant. The membrane may also obviate the need for a separate clarifier sludge return pump. Thus, a membrane is preferred.

Mixed liquor aerated wastewater with sludge is returned from the aeration tank 11 to the anoxic tank 10 by means of a pump 26, which pump can be dynamic, such as centrifugal (e.g., pump flow, axial flow, mixed flow, self-priming, canned-rotor, single or multi-stage, turbine, volute, regenerative turbine, pilot-tube, disk, elbow, vertical propeller, partial emission and in-line), positive displacement, such as reciprocating (e.g., crank-driven), controlled volume (e.g., plunger, diaphragm), rotary (e.g., screw, gear, processing cavity, vane, lobe, tubular, and cam and piston) hydrostatic, or peristaltic, through conduit 7, thereby providing a recycle to anoxic tank 10.

The contents of the anoxic tank 10 are, most often, mixed by action of a submersed mixer 3, wherein denitrification occurs in an area with a dominant anoxic environment, characterized by the partial or total lack of dissolved oxygen and the existence of chemically combined oxygen.

New waste, which typically contains little oxygen, enters the denitrification tank 10 where it is mixed with sludge returned from the aeration tank 12, preferably from a portion of it, such as a lower corner, that is far away from highly oxic mixed liquor. The rate of return for the sludge from the aeration basin is preferably equal to 2-4 times the influent flow of waste into the treatment apparatus. In a preferred embodiment, sludge is also returned to the denitrification tank 10 from a clarifier (optionally following the aeration tank), preferably by means of a sludge return pump. This sludge also contains little oxygen. It is preferably returned at a rate of approximately 50-100 percent of the average influent flow of waste into the treatment apparatus. The re-circulation and sludge return pumps provide continuous return flow to the denitrifying tank, so that there is a continuous cycle of denitrification and nitrification. Repeated cycles increase the effectiveness of the process and also provide for organic phosphorous uptake through biological activity. By the above means, the oxygen content of the denitrification chamber preferably remains below 0.5 mg/L. By providing a fresh source of carbon with the influent, denitrifying bacteria can thrive.

Mixed liquor is also delivered to a membrane tank 12 by means of a pump 4 through pipe 5. Pump 4 can be dynamic, such as centrifugal (e.g., pump flow, axial flow, mixed flow, self-priming, canned-rotor, single or multi-stage, turbine, volute, regenerative turbine, pilot-tube, disk, elbow, vertical propeller, partial emission and in-line), positive displacement, such as reciprocating (e.g., crank-driven), controlled volume (e.g., plunger, diaphragm), rotary (e.g., screw, gear, processing cavity, vane, lobe, tubular, and cam and piston) hydrostatic, or peristaltic, and may be the same or different from pump 26. Mixed liquor in the membrane tank 12 is returned to the aeration tank 11 by gravity through the overflow port 13, which may be supplemented with or replaced by a pump.

Although less preferred, it is possible to combine the inputs of pipes 5 and 7, as well as the functions of pumps 4 and 26. By utilizing a t-diverter 28 (not shown) between a new single input pipe 57 (not shown) and pipes 5 and 7, the complexity of the apparatus can be reduced.

Membrane cartridge or cartridges 8 separate clean permeate from the aerated wastewater as it passes through membrane plates 30, and remove the particles of solids, bacteria and viruses which remain in the membrane tank 12, with the cleaned wastewater permeate passing through the membranes 32 of the membrane plates and subsequently discharged through pipe 14. The membrane plates may be stacked, e.g., independently horizontally or vertically, in each cartridge 8. A blower or compressor 29 can be used to provide aeration to the membrane plates 30 through pipes 15 to clean the surface of the flat membrane plates 30 by air scouring to remove solids or fixed film growth on the plates. In addition, a blower or compressor 29 can provide aeration to the membrane tank 12 to increase the dissolved oxygen level in the membrane tank 12. Excess sludge is drawn off through pipe 9 where it is further treated or stored.

Blower/compressor 29 can also function to move cartridges 8 through the membrane tank 12 to concurrently mix the contents of tank 12 and to subject a greater percentage of the contents of tank 12 to the membrane cartridges 8 per unit time. In one embodiment, each cartridge 8 is connected to the same track, belt or chain 39 (not shown) which directs the cartridges 8 along the same path through tank 12. Such a path can be in the form of a single loop, such as circular or oblong, or may be in the form of a multiple loop path, such as a figure eight or other circuitous path. In another embodiment, a plurality of drive mechanisms are provided, such that different cartridges 8 are driven independently of each other, for example, cartridges 8 can be arranged along the perimeters of concentric circles, and be driven by different mechanisms, such that each travels the entire perimeter in the same period of time. Additionally, one or more cartridges 8 may be rotated about its own axis, such that they can spin while moving about its path.

The cartridges 8 preferably contain one or more membrane plates 30, each of which functions as a highly efficient filter, reducing particulate matter. In a preferred embodiment, each cartridge 8 produces clean permeate having:

(1) no more than 100, typically less than 10, and preferably 5 or less mg/L for BOD (biochemical oxygen demand) and total suspended solids;

(2) no more than 100, typically less than 10, and preferably 5 or less mg/L for total nitrogen; and/or (3) no more than 10, typically less than 5, and preferably 0.5 or less mg/L for total phosphorous.

Additionally, although not preferred, the cartridges 8 may function, in addition to removing particulate matter, to chemically, biologically or physically treat the clean permeate. For example, the cartridges 8 may effectuate a pH neutralizing function (as described by U.S. Patent Application Publication Nos. 2005/0145548 and 2003/0094406), a hardness treating function (as described by U.S. Patent Application Publication No. 2005/0103717), antibacterial/antimicrobial functions, and/or UV or other irradiating functions. One or more of such functions can make the cleaned permeate potable. Other embodiments permit removal of pathogenic microorganisms (e.g., protozoans, bacteria and viruses (usually about 0.1 microns) that are less than about 5 microns in size), either through the membranes 32 or some other elements of cartridges 8. Examples of some microorganisms which can be removed include cryptosporidium (about 10 microns), *giardia lamblia*, and *entamoeba histolytica*. Each reference discussed in this paragraph is incorporated by reference in its entirety.

Figure 3:
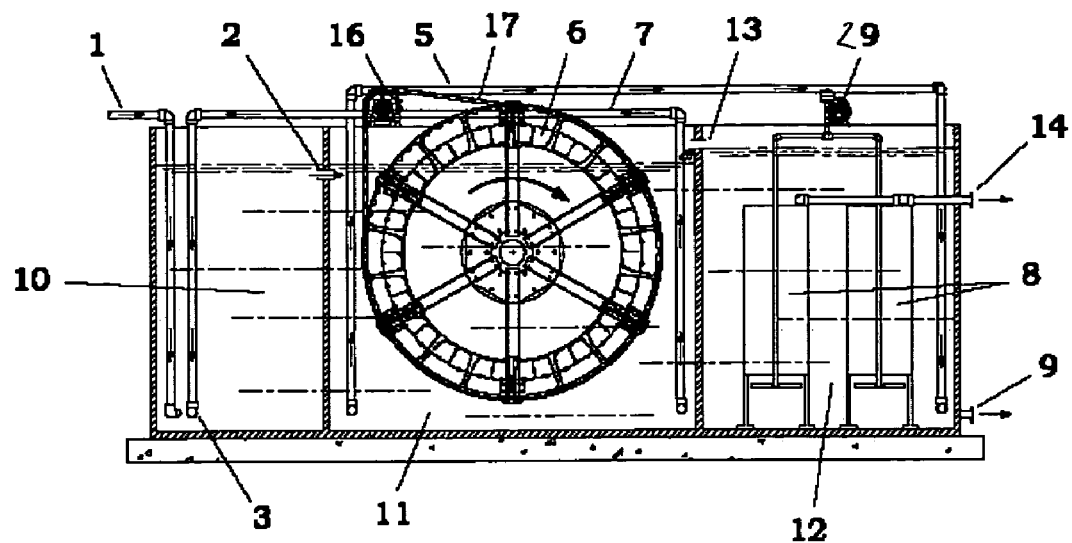
FIG. 3 is a cross-sectional side view of a second embodiment of the apparatus of the invention.
Figure 4:
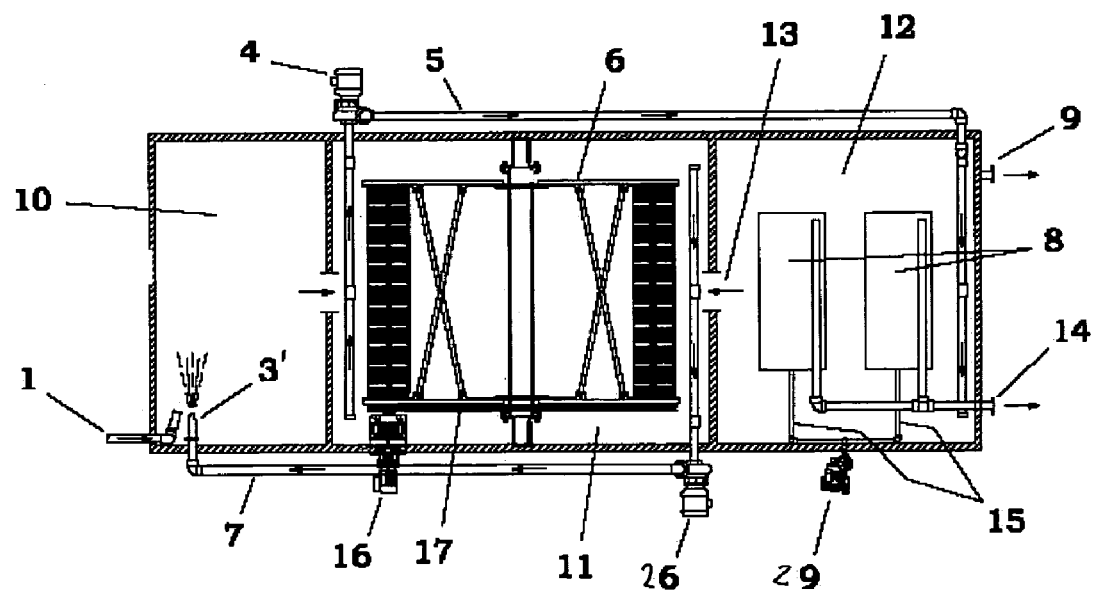
FIG. 4 is a plan view of the embodiment of FIG. 3.

FIGS. 3 and 4 depict a second embodiment of the invention wherein the submersed mixer 3 of FIGS. 1 and 2 is replaced by a mixing nozzle 3'. In this embodiment, the contents of the anoxic tank 10 are mixed by action of the nozzle 3', placed in close proximity to the discharge of the raw influent wastewater pipe 1.

Although the invention is shown in the accompanying drawings as having a single anoxic/denitrification tank, a single aeration tank and a single membrane tank in series, it is considered within the scope of the invention to vary the number and location of the various tanks. Preferably, however, a single aeration tank is followed by a single membrane tank, as shown. However, other embodiments include, in addition to the anoxic/denitrification tank, one or more anaerobic tanks. Such anaerobic tanks are typically located immediately before or after the aeration tank, with the membrane tank being the final stage of the process.

Figure 5:
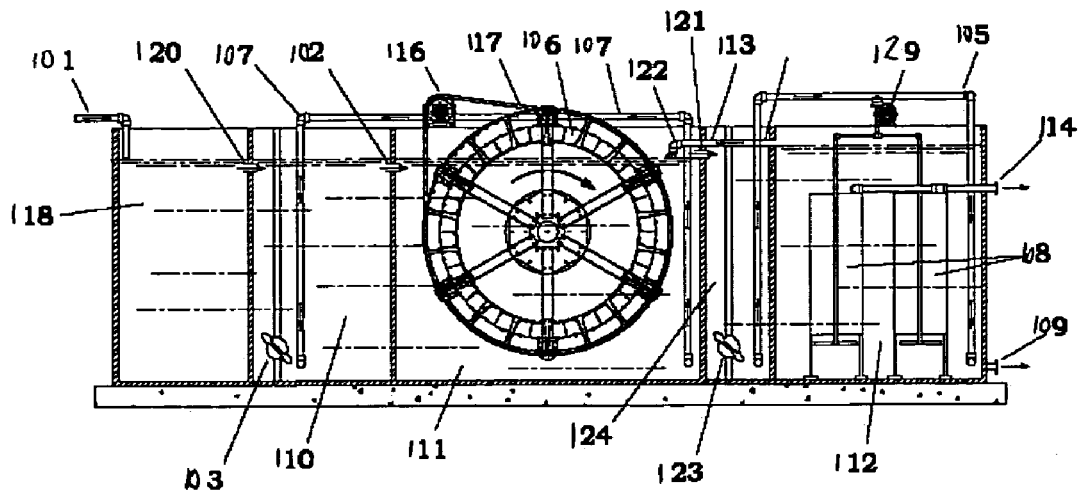
FIG. 5 is a cross-sectional side view of a third embodiment of the apparatus of the invention.
Figure 6:
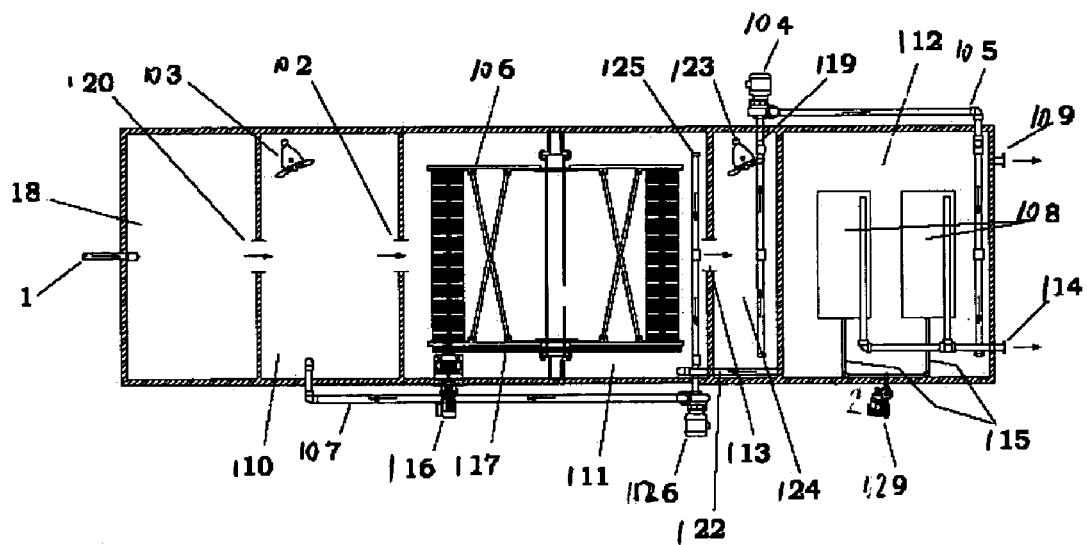
FIG. 6 is a plan view of the embodiment of FIG. 5.

FIGS. 5 and 6 illustrate a preferred alternate configuration of the device of the invention. Raw domestic or suitable industrial wastewater enters through pipe 100 and flows into an anaerobic tank 118. Phosphorous in the wastewater is removed by biological uptake for normal cell growth in anaerobic tank 118, which is characterized by the partial or total lack of dissolved oxygen and of chemically combined oxygen. This environment promotes further denitrification and phosphorous uptake.

The now essentially phosphorous-free water overflows by gravity through opening 120 (which may be replaced by or supplemented by a pump) into the anoxic tank (denitrification tank) 110 where denitrification occurs by conversion of nitrates to nitrogen gas.

Flow continues by gravity through opening 102 to the aeration (aerobic) tank 111 (which may be supplemented by or replaced with a pump) where the rotary aerator 106 (preferably a BIO-WHEEL device) is rotated, typically by an electrical gearmotor 116 through a chain 117, which causes aeration of the wastewater, and provides a fixed film for additional treatment. The rotary aerator 106 performs as an IFAS (activated sludge fixed film) process, where carbonaceous material and ammonia are broken down into components.

Mixed liquor (aerated wastewater with sludge) is returned from the aeration tank 111 to the anoxic tank 110 by means of pump 126. Pump 126 can be dynamic, such as centrifugal (e.g., pump flow, axial flow, mixed flow, self-priming, canned-rotor, single or multi-stage, turbine, volute, regenerative turbine, pilot-tube, disk, elbow, vertical propeller, partial emission and in-line), positive displacement, such as reciprocating (e.g., crank-driven), controlled volume (e.g., plunger, diaphragm), rotary (e.g., screw, gear, processing cavity, vane, lobe, tubular, and cam and piston) hydrostatic, or peristaltic. The mixed liquor is directed by pump 126 from the aeration tank 111 via pipe 107.

The contents of the anoxic tank 110 are preferably mixed by action of a submersed mixer 103 to ensure homogeneity of the contents to provide additional denitrification.

Aerobic mixed liquor from the aeration tank 111 preferably flows by gravity through opening 121 (which may be supplemented or replaced by a pump) to a second anoxic tank 124 where the liquor is mixed by mixer 123.

Each of submersed mixer 103 and mixer 123 can be any type of conventional mixer, and are used to agitate the contents of the respective tanks. Suitable mixers include impellers (e.g., radial-flow, flat-blade, axial-flow, unbaffled, anchor, helical), propeller, turbine, mixers (e.g., in-line, batch, change-can, stationary tank, double arm kneading, intensive, roll mill, cone and screw, ribbon blender, pan muller, continuous, single-screw extruder), and other devices which can effectuate a distribution of the contents of the respective tanks.

Mixed liquor is delivered to the membrane tank 112 through pipe 119 by means of pump 104, through pipe 105. Mixed liquor in the membrane tank 1121 is returned to the aeration tank 111 preferably by gravity through pipe 122, which may or may not be replaced by or supplemented with a pump. Pump 104 can be the same or different from pump 106 and can be dynamic, such as centrifugal (e.g., pump flow, axial flow, mixed flow, self-priming, canned-rotor, single or multi-stage, turbine, volute, regenerative turbine, pilot-tube, disk, elbow, vertical propeller, partial emission and in-line), positive displacement, such as reciprocating (e.g., crank-driven), controlled volume (e.g., plunger, diaphragm), rotary (e.g., screw, gear, processing cavity, vane, lobe, tubular, and cam and piston) hydrostatic, or peristaltic.

The membrane cartridge or cartridges 108 separate the clean permeate from the aerated wastewater as it passes through the membrane plates, and remove the solid particles, bacteria and viruses, of sludge which remain in the membrane tank 112, with the cleaned wastewater (permeate) passing through the membranes and subsequently discharged through pipe 114. The blower or compressor 129 provides aeration to the membrane elements through pipe(s) 115 to clean the surface of the flat membrane plates by air scouring to remove sludge or fixed film growth on the plates. In addition, the blower or compressor 129 provides aeration to the membrane tank 112 to increase the dissolved oxygen level in the membrane tank 112. Excess sludge is drawn off through pipe 109 where it is further treated or stored.

The invention is not limited to the embodiments shown since they can be modified by those skilled in the art without departing from the spirit and scope of the appended claims.

I claim:

1. A wastewater treatment apparatus comprising:
a rotary aerator positioned in an aeration basin, said aerator comprising a fixed film;
at least one membrane positioned downstream of said rotary aerator for removing solid particles from treated wastewater treated by said rotary aerator; and
a denitrification chamber positioned upstream of said rotary aerator.

2. The wastewater treatment apparatus of claim 1, further comprising a conduit positioned as to recycle wastewater from said rotary aerator into said denitrification chamber.

3. The wastewater treatment apparatus of claim 1, wherein said denitrification chamber comprises a mixer.

4. The wastewater treatment apparatus of claim 1, wherein at least one membrane is positioned in a cartridge.

5. The wastewater treatment apparatus of claim 1 wherein said at least one membrane and an aeration blower are positioned in a membrane chamber.

6. The wastewater treatment apparatus of claim 1, wherein said membrane has pore sizes of no greater than 5 microns.

7. The wastewater treatment apparatus of claim 1, wherein said membrane has pore sizes of no greater than approximate 0.1 microns.

8. The wastewater treatment apparatus of claim 1, wherein said membrane has pore sizes no greater than 10 microns.

9. The wastewater treatment apparatus of claim 1, further comprising a sludge removal element, positioned so as to remove sludge or film growth on said membrane.

10. The wastewater treatment apparatus of claim 9, wherein said sludge removal element is selected from the group consisting of a blower and a compressor.

11. The wastewater treatment apparatus of claim 1, wherein the membrane is a plate membrane.

12. A wastewater treatment apparatus comprising:
a rotary aerator positioned in an aeration basin said aerator comprising a fixed film; and
at least one membrane positioned downstream of said rotary aerator for removing solid particles from treated wastewater treated by said rotary aerator;
wherein said at least one membrane is positioned in a cartridge and said cartridge comprises a plurality of membrane plates.

13. The wastewater treatment apparatus of claim 12, wherein said membrane plates are stacked in said cartridge.

14. The wastewater treatment apparatus of claim 12, wherein said at least one membrane and an aeration blower are positioned in a membrane chamber.

15. A wastewater treatment apparatus comprising:
a rotary aerator positioned in an aeration basin, said aerator comprising a fixed film;
at least one membrane positioned downstream of said rotary aerator for removing solid particles from treated wastewater treated by said rotary aerator; and
at least one anaerobic chamber positioned upstream of said membrane.

16. A wastewater treatment apparatus comprising:
a rotary aerator positioned in an aeration basin said aerator comprising a fixed film;
at least one membrane positioned downstream of said rotary aerator for removing solid particles from treated wastewater treated by said rotary aerator; and at least one anoxic chamber positioned upstream of said membrane.

17. The wastewater treatment apparatus of claim 16, wherein the anoxic chamber is positioned between the rotary aerator and the membrane.

18. A wastewater treatment apparatus comprising:
a rotary aerator positioned in an aeration basin, said aerator comprising a fixed film and
at least one membrane positioned downstream of said rotary aerator for removing solid particles from treated wastewater treated by said rotary aerator,
wherein at least one clarifier is positioned upstream of said membrane.

19. A wastewater treatment apparatus comprising:
a rotary aerator positioned in an aeration basin, said aerator comprising a fixed film; and
at least one membrane positioned downstream of said rotary aerator for removing solid particles from treated wastewater treated by said rotary aerator;
wherein the membrane is a hollow fiber membrane.

20. A wastewater treatment apparatus comprising:
a rotary aerator positioned in an aeration basin, said aerator comprising a fixed film, and
at least one membrane positioned downstream of said rotary aerator for removing solid particles from treated wastewater treated by said rotary aerator;
wherein said at least one membrane is positioned in a membrane chamber, and said at least one membrane is relatively movable through said membrane chamber.

* * * * *